United States Patent [19]

Nakano et al.

[11] 3,984,648
[45] Oct. 5, 1976

[54] CIRCUIT BREAKER ACTUATING DEVICE

[75] Inventors: Zenichi Nakano; Goro Hirose, both of Hitachi, Japan

[73] Assignee: Hitachi, Ltd., Japan

[22] Filed: Aug. 28, 1973

[21] Appl. No.: 392,321

[30] Foreign Application Priority Data
Sept. 14, 1972 Japan.................................. 47-91737

[52] U.S. Cl. ............................ 200/82 B; 91/417 R; 91/449; 137/630.15
[51] Int. Cl.².................. F15B 13/044; F16K 31/44; H01H 35/38
[58] Field of Search................. 91/417 R, 418, 449; 137/630.15, 467, 614.16; 251/77; 200/82 B

[56] References Cited
UNITED STATES PATENTS

| 1,060,399 | 4/1913 | Allard | 251/68 X |
|---|---|---|---|
| 2,370,182 | 2/1945 | Morrow et al. | 137/630.15 X |
| 2,740,859 | 4/1956 | Beatty et al. | 93/417 |
| 2,933,069 | 4/1960 | Gratzmuller | 91/454 X |
| 2,991,758 | 7/1961 | Pfau | 91/417 |
| 3,102,555 | 9/1963 | Botkin | 137/630.15 |
| 3,105,126 | 9/1963 | Peek et al. | 200/82 B |
| 3,389,886 | 6/1968 | Tissot-DuPont | 137/630.15 |

*Primary Examiner*—Irwin C. Cohen
*Attorney, Agent, or Firm*—Craig & Antonelli

[57] ABSTRACT

A circuit breaker actuating device comprising valve means interposed between a high pressure section of an operation fluid and a low pressure section thereof to preclude communication therebetween and adapted to cause a variation in pressure to occur either in a high pressure source or low pressure source when actuated to establish communication between the high pressure section and the low pressure section, so as to thereby actuate piston means and cause a circuit breaker to perform a current interrupting operation.

15 Claims, 4 Drawing Figures

CIRCUIT BREAKER ACTUATING DEVICE

BACKGROUND OF THE INVENTION

This invention relates to circuit breaker actuaing devices, and more particularly it is concerned with a circuit breaker actuating device comprising valve means constructed to permit an operation fluid to pass therethrough in a large quantity in a short time interval upon receipt of an actuation signal, no matter how small in size it may be.

In recent years, there has been an increasing demand for electric power, and power systems have accordingly been increased in capacity. If a short circuit occurs in such power system of high capacity, the accident will spread to associated parts and operations of the system as a whole will have to be suspended, unless the part damaged by the accident is immediately cut off from the system. As the result of such accident, failure of power supply may occur over a wide area for a prolonged period. In order to avoid such accident, circuit breakers employed as means for protecting power systems by interrupting a current should be capable of interrupting a current at high speed. This requirement must be met especially in cases where circuit breakers are of the type which is capable of interrupting a current of super-high voltage and value. Circuit breakers of this type should be capable of effecting two-cycle interruption.

An increase in the capacity of an electric power system makes it necessary to use circuit breakers of a higher interrupting capacity. This entails the need to use a very high force to actuate the interrupting part of such circuit breaker, and consequently an actuating device adapted to actuate the circuit breaker involved should be able to produce a high operation force and act at high speed.

In one type of circuit breaker actuating devices known in the art adapted to produce a high operation force, compressed air or other operation fluid is caused to act on a piston to produce a high operation force. Means for feeding an operation fluid to the piston and causing the fluid to act on the latter should be constructed such that the operation fluid can flow therethrough in a large quantity in a short time interval in order to actuate the piston at high speed. However, it is not possible to produce an operation signal of a large size to render the circuit breaker actuating device operative in view of the capacity of the power source and other factors. Difficulty is thus experienced in directly actuating the value means by the operation signal, so that it becomes necessary to amplify the operation signal to actuate the valve means.

To amplify the operation signal requires the provision of a number of amplifier valves. However, the provision of a number of amplifier valves defeats the object of actuating the circuit breaker actuating device at high speed, because the time required for actuating the amplifier valves is a dead time which has nothing to do with rendering the actuating device operative.

Proposals have been made to obviate this disadvantage by reducing the number of amplifier valves while increasing the capacity of each valve to amplify an operation signal. Such proposals have been unsuccessful in obviating the problem because an increase in the amplification rate of each amplifier valve results in an increase in the operation time of the valve. Thus, the reduction in the number of amplifier valves used does not necessarily lead to an increase in the speed at which the circuit breaker actuative device is rendered operative.

SUMMARY OF THE INVENTION

An object of the invention is to provide a circuit breaker actuating device which can produce a high operation force and act at high speed.

Another object is to provide a circuit breaker actuating device in which the amplifier valves used to amplify an operation signal for actuating the interrupting part are smaller in number than those of circuit breaker actuating devices of the prior art.

Still another object is to provide a circuit breaker actuating device including valve means adapted to permit an operation fluid to pass therethrough in a large quantity in an instant upon receipt of an operation signal.

According to the invention, there is provided a circuit breaker actuating device comprising valve means, resilient means and hook means, such valve means including a body having a hollow space maintained in communication with a high pressure section, a valve cylinder provided in such body, a first valve element slidably mounted in such valve cylinder to seal an opening of the body on the low pressure side and having a hollow portion extending axially of the valve element, a second valve element mounted in the interior of such valve cylinder and adapted to provide a seal between the hollow portion of such first valve element and the interior of such valve cylinder, a resilient means urging by its own biasing force such second valve element to press against such first valve element, and a push-rod extending from the opening on the low pressure side of such body into the interior of such first valve element and adapted to bias such second valve element in the initial stages of its movement and engage such first valve element to bias the latter in later stages; a further resilient means normally urging such push-rod to move toward the second valve element by its biasing force; and such hook means normally precluding the movement of the push-rod toward the second valve element and permitting the same to move toward the second valve element upon receipt of an operation signal.

Other and additional objects and features of the invention will become evident from the description set forth hereinafter when considered in conjunction with the drawings.

DESCRIPTION OF EMBODIMENTS

Figure 1:
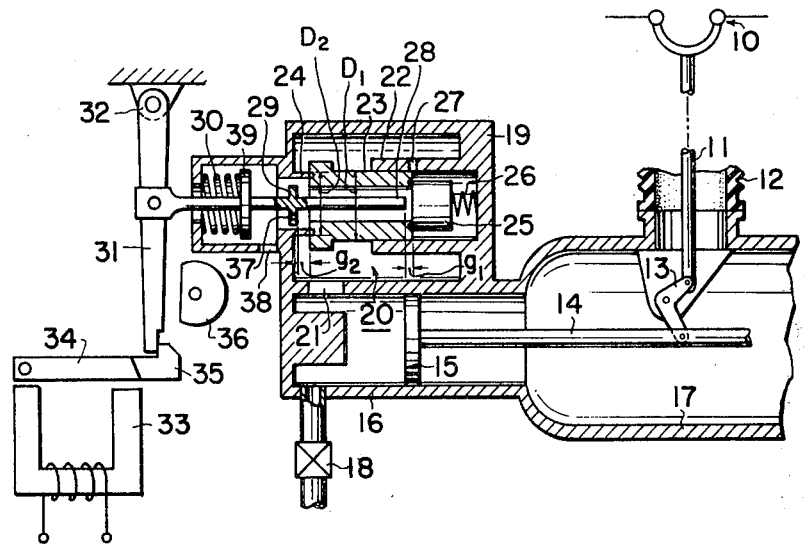
FIG. 1 is a sectional view of the circuit breaker actuating device comprising one embodiment of the invention, showing such device in an inoperative position with the circuit breaker in a closed position.
Figure 2:
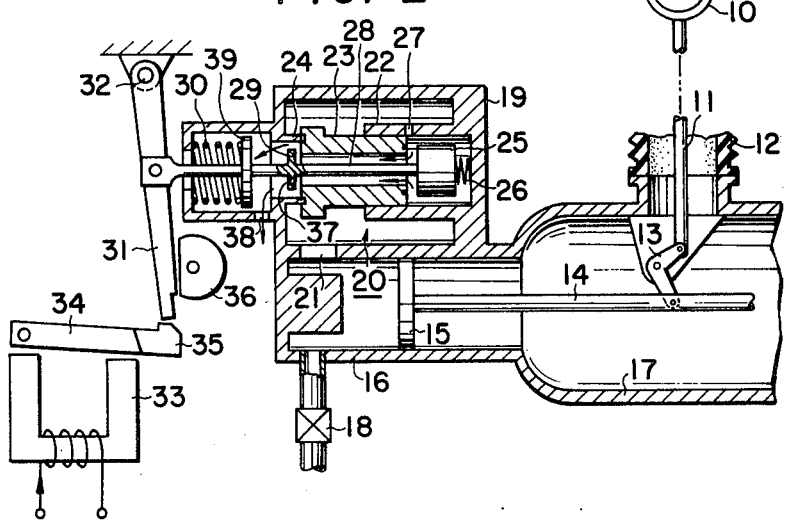
FIG. 2 and FIG. 3 are sectional views of the circuit breaker actuating device illustrated in FIG. 1, showing the manner in which the device operates.
Figure 3:
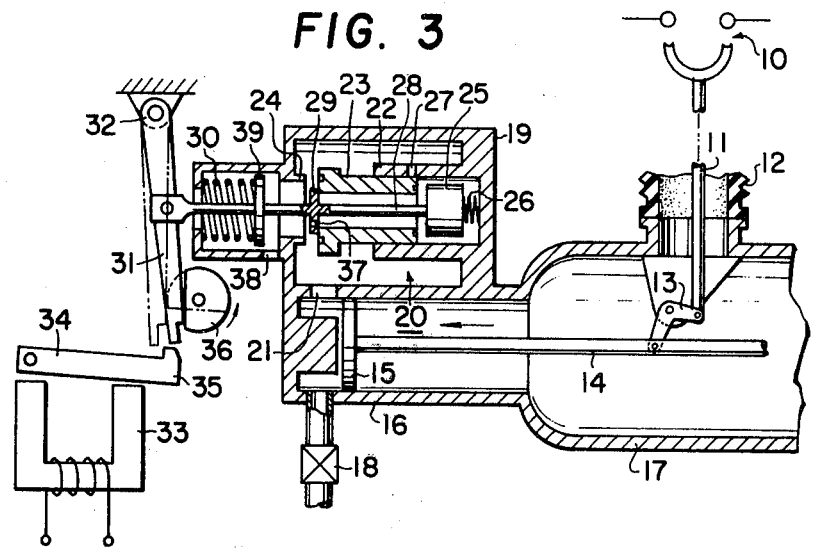

In FIG. 1, FIG. 2 and FIG. 3, an interrupting part 10 of a circuit breaker is either directly connected to an insulated operation rod 11 or actuated through a valve by the insulated operation rod 11. The interrupting part 10 is insulated by an insulating cylinder 12 with respect to the ground. The insulated rod 11 is connected through a linkage 13 to an operation rod 14 which is connected to an operation piston 15 at its forward end. The operation piston 15 is slidably received in an operation cylinder 16 connected to a grounded tank 17 maintained at a ground potential which is filled with compressed air of high pressure. When the actuating device is in a position shown in FIG. 1, a chamber in the operation cylinder 16 disposed leftwardly of the operation piston 15 is also filled with compressed air of high pressure, supplied through a compressed air introducing valve 18 from an air cylinder (not shown) filled with compressed air, to close the interrupting part 10. The grounded tank 17 may serve as the air tank.

A communication port 21 is formed in a portion of a side wall of the operation cylinder 16 disposed leftwardly of the operation piston 15 to maintain communication between the left chamber of the operation cylinder 16 and a hollow space 20 formed in a body 19. Provided in the body 19 is a valve cylinder 22 which receives a first valve element 23 for sliding motion therein. The first valve element 23 has a left end surface which is adapted to be brought into intimate engagement with a valve seat 24 mounted in an opening provided at the low pressure side of the body 19. When such left end surface of first valve element 23 is in intimate engagement with the valve seat 24, the first valve element 23 provides a seal between the hollow space 20 in the interior of the body 19 and the low pressure portion outside the body 19 to thereby keep the compressed air of high pressure in the hollow space 20 from being exhausted. The first valve element 23 and the valve seat 24 are constructed such that the outer diameter $D_1$ of the former is larger than the outer diameter $D_2$ of the latter or $D_1 > D_2$.

Maintained in intimate engagement with a right end surface of the first valve element 23 is a second valve element 25 which is adapted to seal an axially extending hollow space in the first valve element 23. The second valve element 25 is urged by the biasing force of a compression spring 26 into pressing engagement with the right end surface of the first valve element 23 to provide a seal between the interior of the valve cylinder 22 and the low pressure portion outside the body 19. The provision of the second valve element 25, which is smaller in size than the first valve element 23, is effective to cause the first valve 23 to operate at high speed.

Formed in a side wall of the valve cylinder 22 is a small opening 27 through which communication is maintained between the interior of the valve cylinder 22 and the hollow space 20 in the body 19 when the first valve element 23 is in a position shown in FIG. 1. The small opening 27 is closed by the first valve element 23 when the latter is actuated. Thus, when the actuating device is in a position shown in FIG. 1, the first valve element 23 is under the influences of the compressed air of higher pressure in the interior of the valve cylinder 22 and the biasing force of the compression spring 26 acting thereon through the second valve element 25, so that the first valve element 23 is normally positively brought into intimate engagement at its left side with the valve seat 24.

A push-rod 28 adapted to open the first and second valve elements 23, 25 extends through an opening on the lower pressure side of the body 19 into the hollow portion of the first valve element 23 and has a forward end which is spaced apart from the second valve element 25 by a gap $g_1$. As shown in FIG. 2 and FIG. 3, the push-rod 28 is provided with an engaging member 29 which is spaced from the first valve element 23 by a gap $g_2$, the gap $g_2$ being greater than the gap $g_1$ or $g_2 > g_1$.

A compression spring 30 is mounted between a metallic member 39 attached to the push-rod 28 and a left side wall of the body 19 to normally urge the push-rod 28 to move toward the second valve element 25 by its biasing force. Connected to a left end portion of the push-rod 28 is a lever 31 which is pivotally supported at one end by a support pin 32 and engaged at the other end by a hook 35 mounted at a forward end of a movable iron member 34 juxtaposed to an electromagnet 33. The push-rod 28, which is normally urged by the biasing force of the compression spring 30 to move toward the second valve element 25, is held in a position shown in FIG. 1 by the lever 31 which can be reset by a cam 36 operatively connected to the actuating device after being rendered operative.

The operation of the embodiment constructed as aforementioned will now be described. FIG. 1 shows the circuit breaker actuating device in an inoperative position. The hollow space 20 in the body 19 and the interior of the operation cylinder 16 are filled with compressed air of high pressure introduced thereinto through the introducing valve 18. Left and right chambers of the operation cylinder 16 are filled with compressed air of high pressure, so that forces acting on opposite sides of the operation piston 15 cancel each other out and the piston 15 is held in the indicated position by drive means (not shown) connected to rearward end portion of the operation rod 14.

To render the circuit breaker operative to interrupt a current, the electromagnet 33 is excited by an operation signal to attract the movable iron member 34 thereto. This releases the lever 31 from engagement with the hook 35, so that the biasing force of the compression spring 30 acts on the push-rod 28 and moves the same rightwardly as shown in FIG. 2. During its rightward movement, the push-rod 28 abuts against the second valve element 25 after it has moved a distance corresponding to the gap $g_1$, and shifts the second valve element 25 rightwardly against the biasing force of the compression spring 26 and the compressed air acting on the right end surface of the second valve element 25, thereby permitting the compressed air in the interior of the valve cylinder 22 to pass to the lower pressure section.

As aforementioned, the outer diameter $D_1$ of the first valve element 23 is greater than the outer diameter $D_2$ of the valve seat 24. Thus, before the second valve element 25 is moved rightwardly to an open position by the push-rod 28, the first valve element 23 is maintained in intimate engagement with the valve seat 24 by a force which is the sum of $\pi/4\ D_2^2 \times P$ (where P is a pressure in kg/cm²) and the biasing force of the compression spring 26. However, the rightward movement of the second valve element 25 removes this pressing force, and exerts on the first valve element 23 a force $\pi/4(D_1^2 - D_2^2) \times P$ which is oriented in a direction opposite to the direction of the aforementioned pressing force or rightwardly in FIG. 2.

By constructing the first valve elements 23 and the valve seat 24 such that the outer diameter $D_1$ of the former is greater than the outer diameter $D_2$ of the latter, it is possible to move the first valve element 23 rightwardly when the second valve element 25 is moved rightwardly to its open position by the push-rod 28, thereby promoting the movement of the first valve element 23 to an open position. It is to be understood that the requirement of $D_1$ 22 $D_2$ is not essential, so long as a force large enough to maintain the first valve element 23 in intimate engagement with the valve seat 24 is not exerted on the former when the second valve element 25 has moved to its open position.

On the other hand, the push-rod 28 further moves rightwardly. When its movement has covered a distance corresponding to the gap $g_2$, the engaging member 29 attached to the push-rod 28 abuts against the first valve element 23 and moves the same rightwardly out of engagement with the valve seat 24 into an open position. The kinetic energy of the push-rod 28 and the lever 31 is instantaneously given to the first valve 23, and since the first valve 23 is urged to moved rightwardly by the force of compressed air of high pressure upon the passing of the compressed air in the valve cylinder 22 to the lower pressure section as aforementioned, the first valve element 23 is brought to an open position at very high speed. The rightward movement of the first valve element 23 closes the small opening 27 in the valve cylinder 22 so that the compressed air in the interior of the valve cylinder 22 is discharged through an aperture 37 formed in the engaging member 29 to the low pressure section and the interior of the valve cylinder 22 is converted into a low pressure section. This promotes the rightward movement of the first valve element 23.

When the first valve element 23 moves rightwardly as aforementioned, the compressed air in the chamber of the operation cylinder 16 is disposed leftwardly of the operation piston 15 moves through the communication port 21 and the opening at the low pressure side of the body 19 and is exhausted to the outside through an exhaust port 38 formed in the body 19. As a result, the operation piston 15 is moved leftwardly by the compressed air in the grounded tank 17, so as to render the interrupting part 10 operative to interrupt a current through the operation rod 14, linkage 15, and insulated operation rod 11.

The cam 36 which is operatively connected to the circuit breaker actuating device is reset upon completion of actuation of the circuit breaker and is rotated to restore the lever 31 to its original position. The electromagnet 33 is de-energized to release the movable iron member 34 from engagement therewith. This permits the lever 31 to be engaged by the hook 35 again so that the former is kept from moving. Restoration of the lever 31 to its original position moves the push-rod 28 leftwardly so as to charge the compression spring 30 which stores energy therein. The first and second valve elements 23, 25 are moved leftwardly by the biasing force of the compression spring 26, thereby bringing the first valve element 23 into engagement with the valve seat 24 again.

To close the circuit breaker again, compressed air of high pressure is introduced from the air tank (not shown) through the introduction valve 18 to the chamber of the operation cylinder 16 disposed leftwardly of the operation piston 15. This moves the operation piston 15 rightwardly from its position shown in FIG. 3 until the forces acting on opposite sides of the piston 15 balance and the piston 15 becomes stationary. Thus, the operation rod 14 is moved rightwardly by the action of an operation valve (not shown) connected thereto, and closes the interrupting part 10 of the circuit breaker through the linkage 13 and insulated operation rod 11 and brings it to the position shown in FIG. 1. At this time, compressed air is introduced into the hollow space 20 in the interior of the body 19 and into the interior of the valve cylinder 22 through the small opening 27, so that the compressed air acts on the first and second valve elements 23, 25 from inside the valve cylinder 22 and brings the first valve element 23 into intimate pressing engagement with the valve seat 24, thereby positively providing a seal between the valve element 23 and the valve seat 24.

Figure 4:
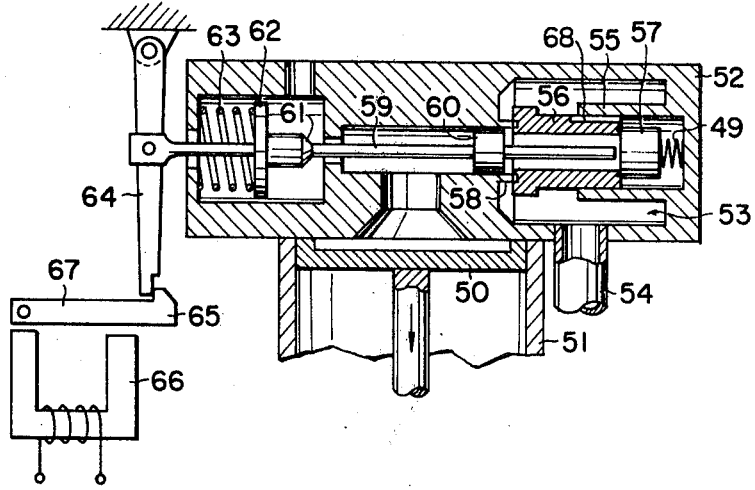
FIG. 4 is a sectional view of the circuit breaker actuating device comprising another embodiment of the invention, showing such device in an inoperative position with the circuit breaker in a closed position.

FIG. 4 illustrates another embodiment of the invention. An interrupting part of a circuit breaker, which is not shown in the interest of brevity, is adapted to perform an interrupting action when a piston 50 moves downwardly in the figure. The interrupting part may be either directly connected to the piston 50 or actuated through another piston of a greater size connected thereto and adapted to be actuated by a valve adapted to be actuated by the movement of the piston 50.

The piston 50 is slidably mounted in a compressed air cylinder 51 in which a chamber disposed upwardly of the piston 50 is a low pressure section when the circuit breaker is closed. A hollow space 53 in a body 52 is normally filled with compressed air of high pressure introduced therein through a connection line 54 connected to an air tank (not shown). A valve cylinder 55 is disposed in the hollow space 53 in the body 52 as is the case with the valve cylinder of the first embodiment, and mounts therein a first valve element 56, second valve element 57 and compression spring 49. The first valve element 56 is normally maintained in engagement with a valve seat 58 provided in an opening on the lower pressure side of the body 52 to provide a seal therebetween.

A push-rod 59 adapted to actuate the first and second valve elements 56, 57 is provided with an engaging member 60 adapted to engage the first valve element 56 and an exhaust valve 61 adapted to operate when the push-rod 59 moves rightwardly. A compression spring 63 is mounted between a side wall of the body 52 and a metallic member 62 attached to the push-rod 59 and adapted to actuate the push-rod 59 by its biasing force. The push-rod 59 is seccured to a lever 64 which is engaged by a hook 65 and kept from moving. The lever 64 is released from engagement with the hook 65 when an operation signal is supplied to an electromagnet 66 which is excited to attract a movable iron member 67 thereto.

In operation, the movable iron member 67 is attracted to the electromagnet 66 upon receipt of an operation signal, so as to release the lever 64 from engagement with the hook 65. As a result, the push-rod 59 is moved rightwardly in FIG. 4 by the biasing force of the compression spring 63 and abuts at its forward end against the second valve element 57 to release the same from engagement with the first valve element 56 and brings it to an open position. Thus, the compressed air in the interior of the valve cylinder 55 is exhausted, thereby reducing the magnitude of forces exerted on the first valve 56.

The push-rod 59 further moves rightwardly until the engaging member 60 attached to the push-rod 59 abuts against the first valve element 56 to release the same from engagement with the valve seat 58 at high speed, thereby supplying the compressed air in the inner space 53 of the body 52 to the interior of the compressed air cylinder 51. More specifically, a slit 68 formed in the first valve element 56 for maintaining the space 53 in communication with the interior of the valve cylinder 55 is closed by the first valve element 56 when the latter is moved by the push-rod 59, and the exhaust valve 61 provided at a rear end portion of the push-rod 59 is moved to a closed position, so that compressed air of higher presure is filled in the interior of the cylilnder 51. Thus, the compressed air in the cylinder 51 acts on the piston 50 to move the same downwardly in the figure. This actuates the interrupting part of the circuit breaker which performs a current interrupting operation.

At this time, compressed air is introduced into the interior of the valve cylinder 55 through a hollow portion of the first valve element 56 to place the interior of the valve cylinder 55 and the space 53 in the body 52 under the same pressure. When the current is interupted as aforementioned, the lever 64 is restored to its original position by the action of a cam (not shown) in which it is engaged by the hook 65. This opens the exhaust valve 61 and exhausts the compressed air in the interior of the cylinder 51. At the same time, the first and second valve elements 56, 57 move leftwardly to bring the first valve element 56 into engagement with the valve seat 58 and seal the cylinder 51 so as to preclude movement of compressed air into the cylinder 51. The interrupting part of the circuit breaker is closed by an interrupting part closing spring or other closing means.

While the invention has been shown and described herein as using compressed air as an operation fluid, it is to be understood that liquid or other gas, such for example as $SF_6$ gas used as an extinction medium for the interrupting part, may be used.

The circuit breaker actuating device according to the invention can have application in all the types of circuit breaker, particularly those circuit breakers which have a high interrupting capacity and which are adapted to act at high speed.

Being constructed and operating as aforementioned, the circuit breaker actuating device according to the invention is capable of acting at high speed to actuate a circuit breaker of a high interrupting capacity at high speed.

What I claim is:

1. In a circuit breaker actuating device of the type including piston means for effecting action of a circuit breaker upon a pressure change acting on said piston means, and actuating means for controlling said piston means as a function of an operation signal produced by a signal means, said actuating means including valve means comprising
    a housing structure having a hollow space communicating with high presure fluid acting on said piston means and having a low pressure portion,
    a valve cylinder provided in said housing structure,
    a valve seat provided in said housing structure between said valve cylinder and said low pressure portion,
    a first valve element slidably mounted in said valve cylinder for sealing separating the high pressure fluid from said low pressure portion by engaging said valve seat, said first valve element being formed with an axially extending hollow portion sliding in said valve cylinder,
    a second valve element mounted with said valve cylinder to provide a seal between the end of said hollow portion of said first valve element and said valve cylinder,
    a resilient member within said valve cylinder for urging said second valve element into engagement with said first valve element, and
    a push-rod means extending from said low pressure portion into said hollow portion of said first valve element, said push-rod means being adapted to first engage said second valve element and then to engage said first valve element upon said operation signal,
    wherein said push-rod means engaging said second valve element enables release of said high pressure fluid within said valve cylinder to said low pressure portion, and said push-rod means engaging said first valve element enables release of said high pressure fluid from said hollow space of said housing structure such that said piston means activates a circuit breaker,
    wherein said actuating means further includes second resilient means normally urging said push-rod means toward said second valve element by the biasing force of said second resilient means, and hook means for engaging said push-rod means such that movement of said push-rod means toward said second valve element is prevented, and signal responsive hook release means for releasing said hook means from engagement with said push-rod means by said operation signal activating said release means such that said push-rod means moves toward said second valve element.

2. A circuit breaker activating device according to claim 1, wherein said push-rod means includes an engaging element mounted on said push-rod means to provide engagement with said first valve element, means maintaining said push-rod means at a spacing with respect to said second valve means prior to said operation signal, said spacing being smaller than a second spacing between said engaging element and said first valve element.

3. A circuit breaker activating device according to claim 1, wherein said first valve element has an outer diameter greater than the outer diameter of said valve seat.

4. A circuit breaker activating device according to claim 1, wherein said piston means comprises a piston actuated by a variation in pressure acting on one face of said piston, said variation in pressure occurring by activation of said valve means, such that the circuit breaker is activated.

5. A circuit breaker actuating device according to claim 1, wherein said release means includes electromagnetic means for controlling said hook means, and wherein said operation signal is an electrical signal.

6. In a circuit breaker actuating device of the type including piston means for effecting action of a circuit breaker upon a pressure change acting on said piston means, and actuating means for controlling said piston means as a function of an operation signal, said actuating means including valve means comprising
    a housing structure having a hollow space communicating with high pressure fluid, acting on said piston means and having a low pressure portion,
    a valve cylinder provided in said housing structure,
    a valve seat provided in said housing structure between said valve cylinder and said low pressure portion,
    a first valve element slidably mounted in said valve cylinder for sealingly separating the high pressure fluid from said low pressure portion by engaging said valve seat, said first valve element being formed with an axially extending hollow portion, a second valve element mounted within said valve cylinder to provide a seal between said hollow portion of said first valve element and said valve cylinder, a resilient member within said valve cylinder for urging said second valve element into engagement with said first valve element, and a push-rod means extending from said low pressure portion into said hollow portion of said first valve element, said push-rod means being adapted to first engage said second valve element and then to engage said first valve element upon said operation signal, wherein said push-rod means engaging said second valve element enables release of said high pressure fluid within said valve cylinder to said low pressure portion, and said push-rod means engaging said first valve element enables release of said high pressure fluid from said hollow space of said housing structure such that said piston means activates a circuit breaker, wherein said valve cylinder is formed with a small opening adapted to introduce said high pressure fluid into said valve cylinder, and wherein said first valve element is movable by said push-rod means to a position for blocking said small opening such that the introduction of said high pressure fluid into said valve cylinder is interrupted by said push-rod means engaging said first and second valve elements.

7. In a circuit breaker actuating device of the type including piston means for effecting action of a circuit breaker upon a pressure change acting on said piston means, and actuating means for controlling said piston means as a function of an operation signal, said actuating means including valve means comprising a housing structure having a hollow space communicating with high pressure fluid acting on said piston means and having a low pressure portion, a valve cylinder provided in said housing structure, a valve seat provided in said housing structure between said valve cylinder and said low pressure portion, a first valve element slidably mounted in said valve cylinder for sealingly separating the high pressure fluid from said low pressure portion by engaging said valve seat, said first valve element being formed with an axially extending hollow portion, a second valve element mounted within said valve cylinder to provide a seal between said hollow portion of said first valve element and said valve cylinder, a resilient member within said valve cylinder for urging said second valve element into engagement with said first valve element, and a push-rod means extending from said low pressure portion into said hollow portion of said first valve element, said push-rod means being adapted to first engage said second valve element and then to engage said first valve element upon said operating signal, wherein said push-rod means engaging said second valve element enables release of said high pressure fluid within said valve cylinder to said low pressure portion, and said push-rod means engaging said first valve element enables release of said high pressure fluid from said hollow space of said housing structure such that said piston means activates a circuit breaker, wherein said first valve element includes a slit on the peripheral wall of said first valve element, said slit introducing said high pressure fluid into the interior of sad valve cylinder, and werein said first valve element is movable by said push-rod means to a position for blocking said slit such that the introduction of said high pressure fluid is interrupted by said push-rod means engaging said first and second valve elements.

8. A valve structure for a circuit breaker actuating device of the type activating a circuit breaker by means of a variation in pressure, said valve structure comprising a housing structure having a hollow space communicating with high pressure fluid and having a low pressure portion, a valve cylinder provided in said housing structure, a valve seat provided in said housing structure between said valve cylinder and said low pressure portion, a first valve element slidably mounted in said valve cylinder for sealingly separating the high pressure fluid from said low pressure portion by engaging said valve seat, said first valve element being formed with an axially extending hollow portion sliding in said valve cylinder, a second valve element mounted within said valve cylinder to provide a seal between the end of said hollow portion of said first valve element and said valve cylinder, a resilient member within said valve cylinder for urging said second valve element into engagement with said first valve element, a push-rod means extending from said low pressure portion into said hollow portion of said first valve element, said push-rod means being adapted to first engage said second valve element and then to engage said first valve element, signal producing means for producing an operation signal for activating said push-rod means, second resilient means normally urging said puah-rod means toward said second valve element by the biasing force of said second resilient means, and hook means for engaging said push-rod means such that movement of said push-rod means toward said second valve element is prevented, and signal responsive hook release means for releasing said hook means from engagement with said push-rod means by said operation signal activating said release means such that said push-rod means moves toward said second valve element.

9. A valve structure according to claim 8, wherein said push-rod means includes an engaging element mounted on said push-rod means to provide engagement with said first valve element, means maintaining said push-rod means at a spacing with respect to said second valve means prior to said operation signal, said spacing being smaller than a second spacing between said engaging element and said first valve element.

10. A valve structure according to claim 8, wherein said first valve element has an outer diameter greater than the outer diameter of said valve seat.

11. A valve structure according to claim 8, wherein said release means comprises electromagnetic means for controlling said hook means and wherein said operation signal is an electrical signal.

12. A valve structure for a circuit breaker actuating device of the type activating a circuit breaker by means of a variation in pressure, said valve structure comprising a housing structure having a hollow space communicating with high pressure fluid and having a low pressure portion, a valve cylinder provided in said housing structure, a valve seat provided in said housing structure between said valve cylinder and said low pressure portion, a first valve element slidably mounted in said valve cylinder for sealingly separating the high pressure fluid from said low pressure portion by engaging said valve seat, said first valve element being formed witn an axially extending hollow portion, a second valve element mounted within said valve cylinder to provide a seal between said hollow portion of said first valve element and said valve cylinder, a resilient member with said valve cylinder for urging said second valve element into engagement with said first valve element, and a push-rod means extending from said low pressure portion into said hollow portion of said first valve element, said push-rod means being adapted to first engage said second valve element and then to engage said first valve element, wherein said valve cylinder is formed with a small opening adapted to introduce said high pressure fluid into said valve cylinder, and wherein said first valve element is movable by said push-rod means to a position for blocking said small opening such that the introduction of said high pressure fluid into said valve cylinder is interrupted by said push-rod means engaging said first and second valve elements.

13. A valve structure for a circuit breaker actuating device of the type activating a circuit breaker by means of a variation in pressure, said valve structure comprising a housing structure having a hollow space communicating with high pressure fluid and having a low pressure portion, a valve cylinder provided in said housing structure, a valve seat provided in said housing structure between said valve cylinder and said low pressure portion, a first valve element slidably mounted in said valve cylinder for sealingly separating the high pressure fluid from said low pressure portion by engaging said valve seat, said first valve element being formed with an axially extending hollow portion, a second valve element mounted within said valve cylinder to provide a seal between said hollow portion of said first valve element and said valve cylinder, a resilient member within said valve cylinder for urging said second valve element into engagement with said first valve element, and a push-rod means extending from said low pressure portion into said hollow portion of said first valve element, said push-rod means being adapted to first engage said second valve element and then to engage said first valve element, wherein said first valve element includes a slit on the peripheral wall of said first valve element, said slit introducing said high pressure fluid into the interior of said valve cylinder, and wherein said first valve element is movable by said push-rod means to a position for blocking said slit such that the introduction of said high pressure fluid is interrupted by said push-rod means engaging said first and second valve elements.

14. In a circuit breaker arrangement of the type including a circuit breaker for interrupting current, piston means controlling an interrupting part for effecting action of said circuit breaker upon a pressure change acting on said piston means, and actuating means for controlling said piston means as a function of an operation signal produced by a signal means, said actuating means including valve means comprising a housing structure having a hollow space communicating with high pressure fluid acting on said piston means and having a low pressure portion, a valve cylinder provided in said housing structure, a valve seat provided in said housing structure between said valve cylinder and said low pressure portion, a first valve element slidably mounted in said valve cylinder for sealingly separating the high pressure fluid from said low pressure portion by engaging said valve seat, said first valve element being formed with an axially extending hollow portion sliding in said valve cylinder, a second valve element mounted within said valve cylinder to provide a seal between the end of said hollow portion of said first valve element and said valve cylinder, a resilient member within said valve cylinder for urging said second valve element into engagement with said first valve element.

a push-rod means extending from said low pressure portion into said hollow portion of said first valve element, said push-rod means being adapted to first engage said second valve element and then to engage said first valve element upon said operation signal, second resilient means normally urging said push-rod means toward said second valve element by the biasing force of said second resilient means, and hook means for engaging said push-rod means such that movement of said push-rod means toward said second valve element is prevented, and signal responsive hook release means for releasing said hook means from engagement with said push-rod means by said operation signal such that said push-rod means moves toward said second valve element, wherein said push-rod means engaging said second valve element enables release of said high pressure fluid within said valve cylinder to said low pressure portion, and said push-rod means engaging said first valve element enables release of said high pressure fluid from said hollow space of said housing structure such that said piston means activates said circuit breaker.

15. A circuit breaker arrangement according to claim 14, wherein said release means includes electromagnetic means for controlling said hook means, and wherein said operation signal is an electrical signal.

* * * * *